United States Patent [19]
Williamson

[11] 3,937,023
[45] Feb. 10, 1976

[54] WASTE AND ORGANIC GARBAGE DISPOSAL SYSTEM WITHOUT OUT-FALL LINE OR SMOKE STACK

[76] Inventor: James T. Williamson, 217 N.W. 20th St., Fort Lauderdale, Fla. 33311

[22] Filed: Apr. 11, 1974

[21] Appl. No.: 460,091

[52] U.S. Cl. .................... 60/670; 60/648; 60/649; 60/721; 204/149; 204/274; 210/152
[51] Int. Cl.² ......................................... F01K 27/00
[58] Field of Search ...... 204/129, 149, 274; 210/59, 210/71, 152; 60/643, 645, 649, 648, 670, 721; 110/108 R

[56] References Cited
UNITED STATES PATENTS

| | | | |
|---|---|---|---|
| 966,025 | 8/1910 | Lautzenhiser | 204/149 |
| 3,147,202 | 9/1964 | Johnson et al. | 204/274 X |
| 3,549,011 | 12/1970 | Marsh | 210/152 X |
| 3,561,377 | 2/1971 | Amundsen | 110/8 R |
| 3,619,391 | 11/1971 | Eisner | 204/149 |
| 3,633,746 | 1/1972 | Dieterich | 210/71 |
| 3,668,120 | 6/1972 | Patterson | 110/8 |
| 3,728,254 | 4/1973 | Carothers | 210/152 X |
| 3,829,368 | 8/1974 | Wesley | 204/149 |

Primary Examiner—Allen M. Ostrager

[57] ABSTRACT

A system and method for destroying waste including garbage, organic trash and sewage in which the waste products are initially combined in an emulsifier, grinder, or shredder at the source such as a residential dwelling or business establishment and pumped through present sewage lines to a slurry tank. The basic system can also be utilized on marine, land and air vehicles. The enriched slurry mixture of waste is pumped into a reactor chamber where through an electrolitic reaction it causes the slurry to produce its own pressure achieving the by-products of high pressure steam to drive a turbine-driven electrical generator and sterilized water with only a residue of ash being produced. The by-product of electricity may be utilized for heating the slurry mixture in the reactor while providing electrical power for other uses. Excess condensate from the steam may then be collected and utilized as sterilized water. The system is designed for use at the municipal level to combine various sources of organic-type wate, such as garbage, trash, sewage, to a common disposal point in the community which produces an ash residue with by-products of power and sterilized water being achieved from the total system. The system is also designed in its basic concept to be utilized on marine, land and air vehicles.

1 Claim, 1 Drawing Figure

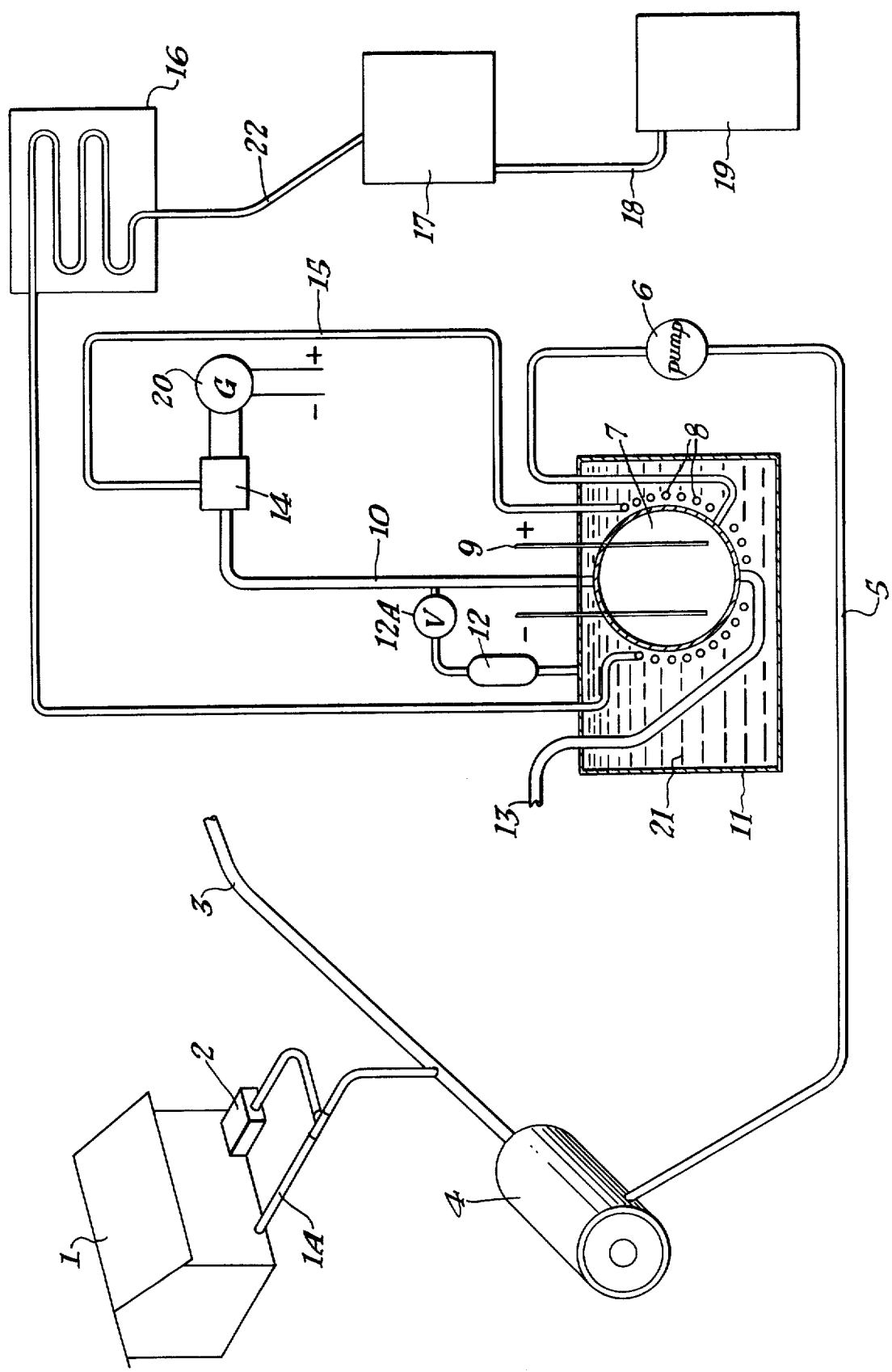

ns
3,937,023

WASTE AND ORGANIC GARBAGE DISPOSAL SYSTEM WITHOUT OUT-FALL LINE OR SMOKE STACK

BACKGROUND OF THE INVENTION

This invention relates generally to an improved system for waste removal and disposal at a community level, and more particularly to an improved system which utilizes the present sewage pipe system to pump waste and especially organic-type waste materials to a common point in the community where it may be disposed of in the reactor chamber under high pressure and temperature to produce steam which may drive a turbine driven electrical generator and sterilized water with the only waste product being an ash which may be readily disposed of as land fill or fertilizer or soil conditioner and not being a water, land or air polutant.

Present day waste removal and disposal systems commonly employed at the community and municipal level include a plurality of different systems which are quite inefficient in that sewage trash and garbage are removed and treated with completely separate systems. Sewage is removed and treated at one location. Papers, garbage and trash are picked up and delivered to a common burning point or incinerator and while still other items of trash, such as bottles, cans and plastics are mixed in with the organic trash that is burned, making it very difficult to separate and recycle. Further, the burning of trash increases air pollution problems from the smoke and products that are discharged into the atmosphere during the burning.

Applicant's invention overcomes these problems by combining various wastes so that the material, such as cans and bottles which can be recycled can be separated at the source of waste such as a residential or business establishment level. Utilizing the present facilities of sewage lines, Applicant's system includes combining yard trash, sewage and garbage at a common point which is emulsified into a slurry at the source of waste and then pumped to the reactor chamber where the waste is reduced and transformed into high pressure steam which may be utilized to drive a turbine driven electrical generator and an ash which may be readily disposed of without air pollution. The utilization of Applicant's system can reduce expenses to the municipality or the like by providing more efficient and total waste removal and destruction with valuable by-products being extracted during the waste disposal under a continuous operation.

BRIEF DESCRIPTION OF THE INVENTION

An improved waste disposal system for destroying garbage, organic trash, sewage and the like, which comprises an emulsifying, grinding or shredding means at the source of waste for emulsifying, grinding or shredding waste, such as organic trash, sewage and garbage into a slurry including the addition of water, a standard sewage line means connecting said initial emulsifying means to a collection tank in the existing sewer system with or without agitators, a feeder line means connecting said collection tank through a feeder pump means to the reactor chamber, electronic probes inside the said reactor chamber for producing an electro-chemical reaction in the slurry, causing the slurry to increase in temperature through an electro-chemical reaction which eliminates odors and produces its own pressure, with an end result of a reduction of the slurry converting it into steam and ash, a steam pipe means for conducting steam from said reactor chamber, a turbine driven electrical generator means connected to said steam pipe providing electrical energy, and a residue disposing pipe connected to said reactor chamber for blow-down to rid the chamber of ash.

In operation, waste material and especially organic materials are emulsified at the source and include paper, which is a recycleable material but will disintegrate, organic trash, sewage and garbage to be ground up and shredded into a slurry which is liquified in water and is pumped to a collection tank, from where the slurry is pumped into the reactor chamber. An electrical current to the electronic probes produces an electronic reation in the slurry causing the slurry to increase in temperature through an electrochemical reaction which eliminates odors and produces its own pressure to a point where it is broken down achieving high pressure steam from the water and hydrogen and oxygen contained in the organic materials while the solid residue is reduced to an ash.

It is an object of this invention to provide an improved waste disposal system.

It is another object of this invention to provide an improved waste disposal system which eliminates organic trash, garbage and sewage and provides an electrical power by-product of the waste destruction.

And still yet another object of this invention is to provide an unified waste disposal system which eliminates sewage, organic trash and garbage and combines it into a single mixture which is reduced to an ash eliminating air pollution caused from the present day combustion of these materials.

And yet still another object of this invention is to provide an improved waste disposal system which utilizes standard sewage-type equipment now in use and available which will greatly minimize the installation expenditure.

And yet still another object of this invention is to provide an organic trash, garbage and sewage disposal system which has, as a by-product, generation of electrical power and recycling of sterilized water.

And yet still another object of this invention is to provide an organic trash, garbage and sewage system which will eliminate out-fall lines.

And yet still another object of this invention is to provide an organic trash, garbage and sewage system which could be utilized in marine, air and land vehicles both commercial and recreational.

And yet still another object of this invention is to provide an organic trash garbage and sewage system for ports, airports and marinas where currently vessels come to discharge.

And yet still another object of this invention is to provide an organic trash, garbage and sewage system which will eliminate the need for sludge ponds, therefore eliminating the need to add chemicals and insecticides to out environment.

And yet still another object of this invention is to provide an organic trash, garbage and sewage system which would allow, at the source, the separation of recycleable materials, such as bottles, plastics, cans and mass lots of paper, which would be picked up by inexpensive flat-bed trucks, and packaged for sale to recycling plants.

In accordance with these and other objects which will be apparent hereinafter, the invention will now be described with particular reference to the accompanying drawings.

BRIEF DESCRIPTION OF THE DRAWING

The drawing shows a schematic of Applicant's system including a schematic cross-section of the electronic reactor chamber utilized in Applicant's invention.

PREFERRED EMBODIMENT OF THE INVENTION

Referring now to the drawing, Applicant's system is shown comprising an emulsifier, grinder or shredder 2 which may be installed at the source of waste, such as a residential dwelling or business establishment 1 connected into a standard sewage line system 3 which includes an existing soil line 1A. The sewage pipe is connected to a collection tank 4. A removal pipe 5 is connected to feeder pump 6 and through to the electronic reactor inlet pipe to the interior chamber 7 of the reactor chamber.

For increased efficiency the reactor chamber includes an outer chamber 11 which contains a transformer or other high temperature resistant type oil 21, immersing the inner chamber 7 completely. Connected to the inner chamber 7 is an outlet pipe 13 which provides for the blow-down removal of ash which is the reduced end product of the slurry after it has been destroyed in a high pressure environment. Also connected to the inner chamber 7 is a steam outlet pipe 10 which is connected to a steam driven turbine 14. A surge tank 12 is connected between pipe 10 and the outer chamber 11 to provide a balance of pressure between the inner chamber 7 and the outer chamber 11, controlled by control valve 12A. Also provided in the center of the inner chamber 7 are electronic probes 9 which produce an electrochemical reaction in the slurry causing the slurry to increase in temperature through an electrolitic reaction which eliminates odors, with an end result of a reduction of the slurry converting it into steam and ash. Surrounding the inner chamber is a single continuous pre-heater line 8 which may be connected to the condensate line 15 coming off of the steam driven turbine 14 which provides high temperature condensate for increased efficiency in operation. The pre-heater line (heater coils) could also be electrical, connected to the output of the steam driven electrical generator, or a continuous conductor of lithium from an atomic plant. Line 15 is connected into a condenser lake or heat exchanger 16 which allows the condensate to be cooled and transferred by pipe 22 to a cooling tower 17. From the cooling tower 17, pipe 18 may dispose of the condensate water into any type of chamber area desired represented by 19 and no waste out-fall line.

The turbine is mechanically connected to electrical generator 20 which is utilized to provide electricity for any desired need. The electrical output of the steam driven electrical generator 20 may be connected to electrode probes 9 to provide electrical current for the electro-chemical reaction in the slurry. It may also be mechanically connected to heater coils in the outer chamber.

In operation, waste materials are fed into the shredder, grinder or emulsifier 2 at each particular source 1 of waste. The materials included in this would be garbage, organic trash, non-recycleable papers and organic material, which can be shredded, ground or emulsified and reduced to a pulp-like material. Items, such as cans, bottles, plastics and bulk paper would not be fed into the shredder but would be separated at this point for removal and recycling into the other areas of the community. Organic materials, papers and the like, are then shredded by the emulsifier 2 and mixed with water and pumped into the sewage system conduit 3 where when mixed with sewage, they become a slurry mixture. The mixture is then received into the collection tank 4 then through feeder line to pump 5, pump 6, feeds the enriched slurry directly into the electronic reactor chamber 7. The chamber is kept under high temperature and pressure with the heat being provided by an electro-chemical reaction in the slurry caused by electrical current transmitted through the electronic probes 9. The heater coils 8 which could be electrical, steam or lithium metal from an atomic plant are utilized to maintain the transformer type oil in the outer chamber 21 at operating temperature which pre-heats the slurry prior to the slurry entering the inner reactor chamber 7 and maintains the immersed reactor chamber 7 at operating temperature. When the slurry is subjected to high temperature and pressures, the water present in and formed from the slurry mixture is evaporated and forms a high pressure steam which exits through pipe 10 and is received into turbine 14 which in turn drives the electrical generator 20. The non-vapor residue produced by the high temperatures and pressures in the chamber, is reduced to an ash which is discharged through blow-down pipe 13 and received into a desired collecting point or final dryers. This eliminates the by-products found today in the burning of trash and disposing of sewage and garbage which is discharged into the atmosphere causing additional air, land and water pollution problems.

Turbine 14 being driven by the high pressure steam is mechanically connected to rotatably drive the mechanical electrical generator 20. The condensate which exhausts from the turbine 14 is fed through line 15 where it may be received either into a cooling lake 16 for cooling or may be returned by dotted line to heater coils 8 which surround the inner chamber to provide additional heating to the chamber. After discharge from the cooling lake 16, the water is then circulated through pipe 22 to a cooling tower 17 which brings the hot water down to atmospherically acceptable temperatures and then pumped through pipe 18 to a lake, reservoir or the like 19 and recycled back into the community.

The reactor chamber is comprised of an outer chamber 11 which holds the oil 21 acting as an insulator and heat transmitter to retain the heat in the inner chamber 7. The inner chamber 7 is shown as spherical which provides for the best efficiency of operation but is not limited thereto. Surge problems caused by fluctuations in the steam and the heated oil are corrected by the pressure equalization chamber 12 controlled by pressure equalization chamber control valve 12A.

With the utilization of Applicant's improved waste disposal system, maximum efficiency is achieved by providing a system which handles several different types of waste matter which can be reduced to an ash form without combustion into the atmosphere while providing by-products of sterilized water and electrical power from the heating of the waste material itself. This also allows for items which cannot be shredded or ground into an emulsion, such as cans, plastics, bottles and bulk paper, to be seperated at the initial waste point so that items such as these are recyclable and reusable. The high temperatures also provide for the sterilization and purification of the water which is utilized in the sewage system and allows it to be recycled back into usable form, without out-fall lines or the like.

The device has been shown and described herein in what is considered to be the most practical and preferred embodiment. It is recognized, however, that departures may be made therefrom within the scope of the invention and that obvious modifications will occur to a person skilled in the art.

What I claim is:

1. An improved waste disposal system comprising:
   an emulsifier means for changing waste such as organic trash, garbage and sewage into a slurry mixture;
   a feeder pump means;
   a collection tank means connected to said emulsifier means for receiving the output slurry of said emulsifier means;
   a reaction chamber means for receiving said slurry mixture connected to said collection tank means by said feeder pump means;
   means for heating and pressurizing the reaction chamber means to a high temperature and high pressure connected to said reaction chamber means;
   steam discharge line connected to said reaction chamber means;
   residue disposal line connected to said reaction chamber means;
   a turbine means connected to said steam discharge line;
   an electrical generating means connected to said turbine means;
   a condensate exhaust line connected from said turbine;
   a reservoir connected to said turbine by said condensate discharge line;
   said heating means including an electrical current heating means connected to said generator and said reactor chamber means, the residual output of said generator disposed to an outside load;
   an outer chamber;
   an inner chamber for receiving said slurry mixture disposed within said outer chamber;
   a fluid insulating means within the outer chamber wherein the inner chamber is totally immersed within said insulating fluid means; and
   preheating coil means surrounding said inner chamber also immersed in the fluid insulating means, said coil means connected to said condensate discharge line from said turbine.

* * * * *